W. G. DINGLE.
METHOD OF AND APPARATUS FOR PRODUCING LIQUID HYDROCYANIC ACID.
APPLICATION FILED MAY 5, 1917.

1,304,745.

Patented May 27, 1919.
2 SHEETS—SHEET 1.

Witness
C. C. Holly.

Inventor
William G.
Dingle
by James R. Townsend
his atty

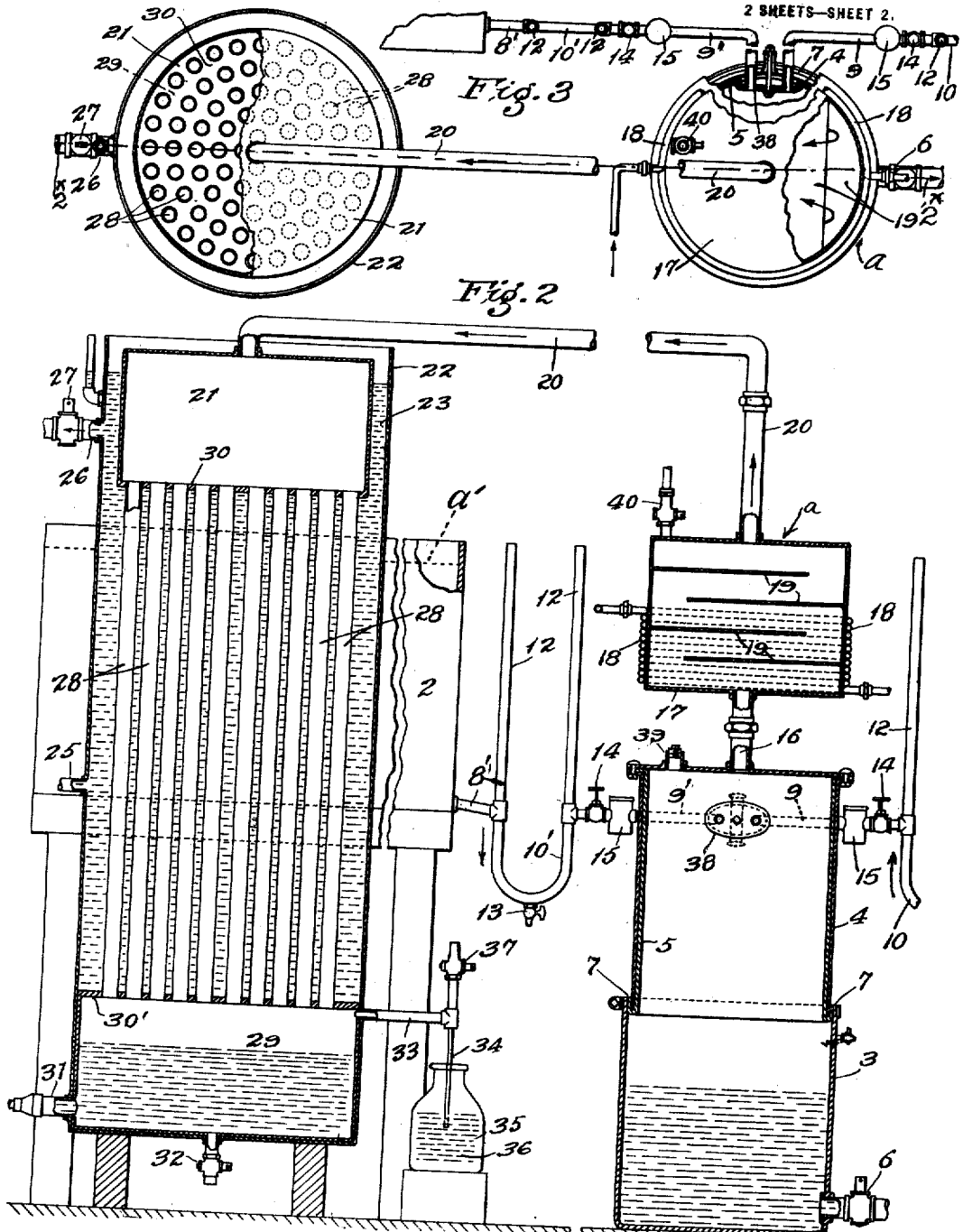

UNITED STATES PATENT OFFICE.

WILLIAM G. DINGLE, OF LOS ANGELES, CALIFORNIA.

METHOD OF AND APPARATUS FOR PRODUCING LIQUID HYDROCYANIC ACID.

1,304,745.   Specification of Letters Patent.   Patented May 27, 1919.

Application filed May 5, 1917. Serial No. 167,118.

*To all whom it may concern:*

Be it known that I, WILLIAM G. DINGLE, a citizen of the United States, residing at Los Angeles, in the county of Los Angeles and State of California, have discovered and invented a new and useful Method of and Apparatus for Producing Liquid Hydrocyanic Acid, of which the following is a specification.

An object of this discovery and invention is the production of liquid hydrocyanic acid commonly known as prussic acid at a minimum cost and without danger to the operators or users.

This invention may be employed in producing hydrocyanic acid for any of the arts, but is especially adapted to the production of liquid hydrocyanic acid on a large scale to be employed in the destruction of animal or insect life or germs by fumigation of pest-infested orchards, houses, ships and the like.

An object is to conveniently, cheaply and safely provide a practically pure liquid hydrocyanic acid which can be applied in a convenient and safe way to the fumigation.

In the practice of this art and in carrying out this invention I employ means involving the use of an invention described and claimed in my co-pending application for patent for gas generators for fumigation, Serial No. 12936, filed March 8, 1915.

An object is to provide pure clean liquid hydrocyanic acid with maximum convenience and with a minimum expenditure of time and labor.

A further object is to accomplish this by means of cheap and simple apparatus, easily constructed, set up and operated.

In practising this art the hydrocyanic acid is produced from the combination of commercial sulfuric acid and a cyanid solution produced by dissolving in water, sodium cyanid or any equivalent, as potassium cyanid.

Waste in the use of cyanid for fumigation purposes heretofore, has arisen from the combination of the hydrocyanic acid with water after the combination of the sulfuric acid and the cyanid solution has been effected, such loss being estimated at about 15% or more.

An object of the invention is to eliminate such loss and this is effected by condensing the excess moisture out of the gas at a temperature which will not condense the gas, and afterward condensing the gas to form a liquid.

The chemical reactions resulting from the combination of the sulfuric acid and the cyanid solution result in a temperature of about 180° Fahrenheit, up to as high as 300° F., and in this method I conduct the gas from the generating chamber to a separating chamber where the temperature is at about 110° F., it being sufficient for this purpose that the separating chamber be made of iron or some equally good heat conductor that is surrounded by atmospheric air, which is depended upon to carry away the surplus heat, and in such chamber the gas is subject to impingement upon condensing surfaces formed by baffles, so that the water and impurities carried thereby may be condensed out of the gas and returned to the generating chamber while the purified gas flows onward to the liquefying apparatus.

It is important that the operation of condensing the water and precipitating the other foreign substances from the gas shall be conducted at a temperature no lower than about 110° F. nor so high as to approach the boiling point of water for the reason in the first instance that at a lower temperature than 110° F. the water will absorb the gas, and at a temperature much above 180° F. vapor is likely to pass on with the gas.

The generating gases are expanded by the heat of the chemical reactions and carry off said heat, and in their expanded condition they also carry off water and impurities foreign to the hydrocyanic acid gas which it is desired to collect; and this is a preliminary step in the production of the liquid hydrocyanic acid. I effect the separation of the hydrocyanic acid gas from the water and from impurities by sufficiently maintaining the temperature of the expanded gaseous and vaporous product to prevent the condensation of the hydrocyanic acid gas and at the same time to so reduce the temperature of the gaseous and vaporous product as to condense and precipitate the water content of such product to the generating chamber with the result that the uncondensed hydrocyanic acid gas flows on practically free from water and from most of the impurities produced by the generating process.

I have found that some of the reactions occurring during the production of hydrocyanic acid gas by the use of the solid cyanid compositions obtained in the open market, result in the production of ammonium chlorid in gaseous form, and that the same is a deleterious component of the fumigating product resulting from the decomposition of such solid cyanid compounds. In carrying out this invention I have provided means for eliminating the ammonium chlorid.

I do not undertake to say that ammonium chlorid will be invariably produced by the reactions accompanying the production of hydrocyanic acid gas from chemicals adapted to such production, and it is understood that in such case, if any may occur wherein ammonium chlorid is not produced, that its absence from the product does not interfere with the process which will hereinafter be more fully detailed.

Further objects and advantages may appear from the accompanying drawings, the subjoined detail description and the appended claims.

The method may be variously conducted and the invention may be variously carried out.

A feature of the process is the elimination of ammonium chlorid from the evolved gas before liquefaction of the hydrocyanic acid gas thus to avoid deterioration of the liquid hydrocyanic acid and also to avoid the danger of explosions.

The discovery and invention may be understood by the following description, reference being had to the accompanying drawings which represent apparatus for the production of liquid hydrocyanic acid for the fumigation of citrus or other trees or for any other purpose.

Fig. 2 is a fragmental sectional elevation on a larger scale taken on line $x^2$ Fig. 3. Line $x^2$ indicates the line of section.

Fig. 3 is a fragmental top plan of a part of the apparatus shown in Fig. 2.

Figure 1:
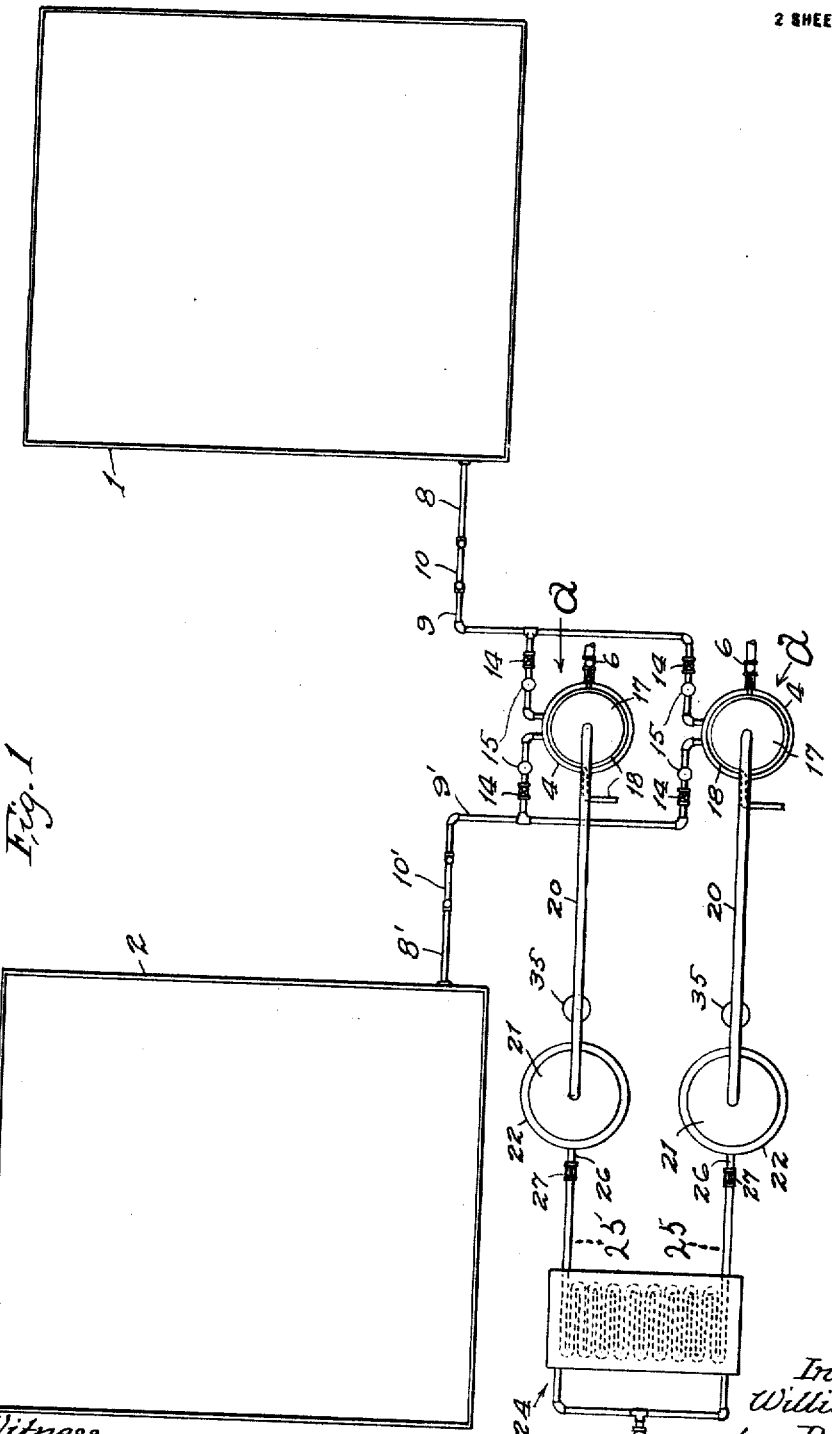
Figure 1 is a diagrammatic plan of an apparatus adapted for use in producing liquid hydrocyanic acid in accordance with this discovery and invention.

Tanks 1 and 2 are open at the top and are respectively adapted to contain cyanid solution and sulfuric acid. The cyanid solution may be made in any well known way as by dissolving sodium cyanid in water in desirable proportions, viz., two pounds of water to one of sodium cyanid. The sulfuric acid employed is the usual commercial sulfuric acid registering 66° Baumé.

The generator 3 is preferably constructed of a cast-lead bottom-chamber 3 and a steel top-chamber 4 having a lead lining 5 therein. The bottom chamber 3 is provided with a valved draw-off 6 for the purpose of drawing off residuum from the generator. The chambers 3 and 4 are connected by gas tight joint 7 formed by bending the lead lining 5 out and up around the bottom of the sheet steel wall 4. Means are provided between the tanks 1 and 2 to conduct the liquid contents therefrom into the generating chamber. Said means comprise conduits 8, 8', respectively connected to the tanks; conduits 9, 9' connected to the generator and opening thereinto at the upper portion of the upper chamber; U-traps 10, 10' extending below the level of the conduits 8, 9, 8', 9'; and extending upward and vented to the open air above the liquid level $a'$ of the tanks, said vents being shown as formed by upwardly extending pipes 12.

The U-traps 10, 10' are provided with petcocks 13 to draw off the contents of the traps. The conduits 9, 9' are provided with valves 14 and meters 15; the valves being for the purpose of regulating the flow, and the meters for the purpose of determining the amount, of liquid passing through the conduits.

Pipes 16 lead from the upper ends of the generator chambers 4 into separators $a$ including temperature regulating, condensing and precipitating chambers 17 that are provided with means 18 by which they may be heated, supplied with heat if required to prevent too great a drop of temperature in cold weather, and with baffles 19 upon which the fluid entering and passing through chamber 17 will impinge thus to condense the water and cause the same and other foreign substances to fall back to the generator 3. Said heating means is shown in the drawings as a steam coil connected to a boiler, not shown, and which may be used or not as external atmospheric conditions may indicate. Said baffle chamber is provided above the impinging surfaces formed by baffles 19, with a gas pipe 20 that leads from the top of separator $a$. In Fig. 1 there is shown a condenser for each of the pipes 20 and in each instance a pipe 20 leads to a cooling chamber 21 forming the top of a condenser which is arranged inside a shell 22 that is adapted to contain a cooling or refrigerating medium 23 which may be salt brine cooled by any suitable means as an ammonia or other refrigerating system indicated in a general way by the character 24 in Fig. 1, and connected to the shell by a pipe 25 which discharges into the shell a distance above the bottom thereof, and a pipe 26 leading from the upper part of the shell to the ammonia plant 24 and controlled by a stop cock 27, so that the height of the cooling liquid in the shell can be regulated.

The condenser pipes 28 extend down from the upper cooling chamber 21 to the collecting chamber 29 of the condenser. Said collecting chamber is seated on the floor of the shell 22. The cooling and collecting chambers are constructed with crown sheets 30, 30' that extend across the bottom of chamber 21 and the top of the chamber 29, and the tubes 28 open therethrough and communicate between said chambers. The chamber 29 is provided with a draw-off cock 31 through which the liquid hydrocyanic acid or prussic acid may be drawn.

The drain cock 32 is provided in the bottom of the chamber 29 to draw off sediment, and a pipe 33 at the top of the lower cooling chamber 29 is connected by a downwardly extending limb 34 to discharge hydrogen and other gases that may be generated through chemical reactions occasioned by the presence of impurities or foreign substances, as for instance, interiorly exposed iron surfaces of the apparatus. Such gases accompanied by hydrocyanic acid are discharged into a receiver 35 containing a charge 36 of an absorptive, as a solution of caustic soda, for the purpose of absorbing any hydrocyanic acid gas which may flow from the chamber 29, thus to avoid loss of cyanogen and danger to the operators. A pet-cock 37 connected to the pipes 33, 34 allows air to be discharged at the beginning of the operation of producing the hydrocyanic acid. The hydrogen and other foreign gases not taken up by the caustic soda solution escape into the open air from the mouth of the receiver.

The long end of the vent pipe 34 is submerged in the caustic soda solution 36 to a depth determined by the operator, so that a predetermined pressure may be applied from the generator to the gas within the chamber 29. This pressure is produced by the reactions of the cyanid solution and the sulfuric acid within the generating chamber 3. Said reactions and the evolution of gas resulting therefrom may practically fill the chambers 3 and 4 with liquid under ebullition, and the hydrocyanic acid gas with water and other foreign substances will pass up through the pipe 16 and into the temperature regulating, condensing and precipitating chamber 17. A temperature of 110° within the separator a is sufficient to hold the hydrocyanic acid gas in gaseous form, but at the same time allows the water to condense and other impurities to precipitate and fall therewith to the bottom of the chamber 17 whence they flow back as a liquid into the generating chamber 3. The purified gas flowing through pipe 20 to the cooling chambers 21, pipes 28, and bottom chamber 29 condenses at a temperature of from 12 to 16° Fahrenheit. Condensation can be effected at a temperature of 22° Fahrenheit, but it is deemed preferable to maintain the pipes 28 at about the temperature of 12 to 16° Fahrenheit.

The hydrocyanic acid gas finding its way into the receiver 35 will combine with the caustic soda solution 36, thus to form sodium cyanid from the cyanogen and soda, while the gases which will not combine with the soda escape through the open mouth of the receiver 35.

In starting the apparatus into operation the cock 37 will at first be open until the odor of the escaping gas warns the operator that the air has been expelled from the system and that the cock should be closed. Or a more desirable method of determining when the cock should be closed is to maintain a flame as by a lighted match or other device at the outlet from the cock 37 until the escaping gas ignites, thus giving warning that the apparatus is filled with gas. Then the cock 37 will be closed. Then the work proceeds as will be understood from the foregoing.

In practice it has been found that when the refrigerating circulation is started and maintained before the charges of the chemicals are delivered to the generator the result of the generation in the generator is to cause the cold air to descend in the cooler and to escape through pipe 33 ahead of the warm generated gas and that when the air has been expelled this fact may be demonstrated at the cock 37 by applying a lighted match, whereupon ignition of an inflammable gas issuing from the cock, will occur without any flare-back or explosion.

If the pressure in the system becomes excessive, bubbles will be rapidly forced up through the caustic soda solution 36, thus indicating to the operator that the gas is being generated so rapidly that it does not properly condense. Thereupon the valves 14 can be regulated, and vice versa.

The pressure within the condensing and precipitating chamber would rise to dangerous proportions if not relieved by the vent pipe 34. The operator will be careful to turn on the sulfuric acid and cyanid solution gradually at first meanwhile watching the escape of bubbles from the receiver 35 after the cock 37 has been closed.

The vent pipe 34 is of reduced diameter so that the escape of gas therefrom will be frictionally retarded, that is to say, the escape of gas is retarded by friction with the walls of the small bore of the pipe 34. The pressure of the gas in the tank 29 is thus reduced somewhat, by a slow escape of gas in addition to the reduction of pressure which results from the cooling of the gas by the refrigerating medium surrounding the vertical pipe 28. This reduction of pressure and the cooling causes free flow of gas from the chamber 17 to chamber 29.

The pipes 9, 9' are let into the upper tank 4 of the generator through a man-hole, the closure 38 of which extends into the chamber far enough to prevent the chemicals from running onto and down the sides of the wall; and the generator is provided with a plugged inlet 39 through which a preliminary charge of water and sulfuric acid may be introduced into the generator before the working charges of the cyanid solution and sulfuric acid are turned on. After the preliminary charge of sulfuric acid and water has been introduced, the inlet 39 will be closed before the cyanid solution and sulfuric acid are turned on. The charge of water and sulfuric acid thus introduced serves as a protector for the bottom of the generating chamber 3 against destructive action of the chemicals and thus adds to the life of the generator.

The water pipe 40 is connected to discharge water into the top of the condensing and precipitating chamber 17 for the purpose of washing out any salts and accumulations that may be formed or may occur in the chamber, and when an amount of residuum that should be removed has accumulated in the generator 3, the draw-off cock 6 will be opened and the residue discharged. Said cock is somewhat above the bottom of the chamber 3 so that a quantity of residuum may be left in the generator to protect the bottom from destructive action of subsequent charges of the solution and acid.

It is thus seen that the heating of the hydrocyanic acid gas before the separating process takes place is important and that the temperature of such heated gas should be between 110° Fahrenheit and 180° Fahrenheit, and that while an expansion of the escaping gas through the pipe 16 into the chamber 17 results in a lowered temperature of the gas as compared with the temperature of the gas in the generating chamber, the temperature of the heated gas must not be below 110° Fahrenheit, but is preferably kept considerably above that temperature so as to facilitate the onflow of the gas while the water and other impurities are being condensed from such heated gas.

It is also to be observed that the refrigerating operation upon the hydrocyanic acid gas is effected while the gas is flowing downward subject to the force of gravity, and that the collection takes place at a considerable distance below the point where the refrigeration begins to be effected, so that the hydrocyanic acid gas becomes denser and denser as it descends until it is deposited as a liquid in the collecting tank 39. Any desired number of units may be connected together to the same supply system and the same refrigerating.

In Fig. 1, two generators and two condensers make up a couple of such units.

I claim:

1. The method of producing hydrocyanic acid or prussic acid which consists in producing hydrocyanic acid gas, heating said gas and passing the heated gas against condensing surfaces thereby precipitating foreign substances from the gas, then cooling the resultant gas and reducing it to liquid form.

2. The method of producing liquid hydrocyanic acid or prussic acid which consists in producing hydrocyanic acid gas, heating said gas and passing the heated gas against condensing surfaces, thereby precipitating impurities from the gas, then cooling the resultant gas and reducing it to liquid form, and then drawing off any remaining free hydrocyanic acid and collecting the same by caustic soda.

3. The method of producing liquid hydrocyanic acid which consists in producing hydrocyanic acid gas, heating the same and causing impurities to precipitate therefrom, cooling and condensing the resultant gaseous product of such cooling operation and collecting the condensed product of such cooling operation under a diminished pressure.

4. The method of producing liquid hydrocyanic acid which consists in producing hydrocyanic acid gas, heating the same and causing impurities to precipitate therefrom, cooling and condensing the resultant gaseous product and collecting the condensed product of such cooling operation under a diminished pressure and drawing off resultant hydrogen.

5. The apparatus set forth comprising a generating chamber, means to supply cyanid solution thereto, means to supply sulfuric acid thereto, means to conduct from said chamber the gases resulting from the combination of said acid and solution, a separating chamber connected to such conducting means; means to regulate the temperature of the separating chamber; a cooling chamber; means to conduct the gas from the separating chamber to the cooling chamber, condensing tubes extending down from the cooling chamber, means to apply a cooling medium to the cooling chamber and tubes, and a collecting chamber into which the condensing tubes discharge.

6. The apparatus set forth comprising a generating chamber, means to supply cyanid solution thereto, means to supply sulfuric acid thereto, means to conduct from said chamber the gases resulting from the union of said acid and solution, a separating chamber connected to said conducting means, means to heat the separating chamber, a cooling chamber, means to conduct gas from the separating chamber to the cooling chamber, condensing tubes extending down from the cooling chamber, means to supply a cooling medium to the cooling chamber and tubes, a collecting chamber into which the condensing tubes discharge, means to conduct free hydrocyanic acid or other gases from the upper portion of the collecting chamber, means to hold a charge adapted to absorb free hydrocyanic acid, and means to conduct hydrogen gas from the upper portion of the collecting chamber and discharge it through the hydrocyanic-acid gas-absorbing means.

7. The combination with a hydrocyanic acid gas generator, of tanks adapted to contain sulfuric acid and cyanid solution respectively, conduits between said tanks respectively and the generating chamber, and traps formed in said conduits and open to the atmosphere.

8. The method set forth which consists in combining sulfuric acid and a cyanid solution containing impurities which under the reaction with the sulfuric acid produces ammonium chlorid, then eliminating the product ammonium chlorid from the gas evolved by said combination, and condensing to a liquid the hydrocyanic acid thus freed.

9. The method set forth which consists in combining sulfuric acid and a cyanid solution, then condensing foreign substances from the hydrocyanic acid gas thus formed, then passing the hydrocyanic acid gas thus formed to a condenser and there condensing said hydrocyanic acid gas to a liquid.

In testimony whereof, I have hereunto set my hand at Los Angeles, California, this 27th day of April, 1917.

WILLIAM G. DINGLE.

Witness:
JAMES R. TOWNSEND.

Copies of this patent may be obtained for five cents each, by addressing the "Commissioner of Patents, Washington, D. C."